United States Patent
Chen

(10) Patent No.: US 9,160,227 B2
(45) Date of Patent: Oct. 13, 2015

(54) POWER SUPPLY APPARATUS WITH LOW STANDBY POWER CONSUMPTION

(71) Applicant: Fu-Chuan Chen, New Taipei (TW)

(72) Inventor: Fu-Chuan Chen, New Taipei (TW)

(73) Assignee: Chicony Power Technology Co., Ltd., New Taipei City (TW)

( * ) Notice: Subject to any disclaimer, the term of this patent is extended or adjusted under 35 U.S.C. 154(b) by 418 days.

(21) Appl. No.: 13/715,576

(22) Filed: Dec. 14, 2012

(65) Prior Publication Data

US 2014/0169046 A1  Jun. 19, 2014

(51) Int. Cl.
*H02M 1/00* (2007.01)
*H02M 1/42* (2007.01)

(52) U.S. Cl.
CPC ...... *H02M 1/4225* (2013.01); *H02M 2001/007* (2013.01); *H02M 2001/0032* (2013.01); *Y02B 70/126* (2013.01); *Y02B 70/16* (2013.01)

(58) Field of Classification Search
CPC .......... H02M 2001/0032; H02M 2001/0035; H02M 2001/0048; H02M 2001/0054; H02M 1/36; H02M 1/4208; H02M 3/335
See application file for complete search history.

(56) References Cited

U.S. PATENT DOCUMENTS

| | | | |
|---|---|---|---|
| 5,555,167 A * | 9/1996 | Fujihashi | 363/49 |
| 6,288,914 B1 * | 9/2001 | Sato | 363/18 |
| 2001/0012210 A1 * | 8/2001 | Nagai et al. | 363/98 |
| 2007/0283175 A1 | 12/2007 | Marinkovic et al. | |
| 2012/0235658 A1 * | 9/2012 | Liu et al. | 323/282 |

FOREIGN PATENT DOCUMENTS

| | | | |
|---|---|---|---|
| TW | 201116988 A | 5/2011 | |
| TW | 201128377 A | 8/2011 | |

* cited by examiner

*Primary Examiner* — Harry Behm
*Assistant Examiner* — Alan Stewart
(74) *Attorney, Agent, or Firm* — Muncy, Geissler, Olds & Lowe, P.C.

(57) ABSTRACT

An electronic apparatus is removed from a power supply apparatus and that can be certified by detecting a secondary-side transformer coil by a no-load detecting unit. The no-load detecting unit is configured to turn off an output switch unit and a power factor correction and pulse width modulation controller. An intermittent driving unit is configured to drive a start unit once a pre-determined time. The start unit is configured to drive the power factor correction and pulse width modulation controller. A load detecting unit is configured to detect that the electronic apparatus is connected to the power supply apparatus. The load detecting unit is configured to drive the intermittent driving unit. The intermittent driving unit is configured to drive the start unit. The start unit is configured to drive the power factor correction and pulse width modulation controller.

10 Claims, 6 Drawing Sheets

POWER SUPPLY APPARATUS WITH LOW STANDBY POWER CONSUMPTION

BACKGROUND OF THE INVENTION

1. Field of the Invention

The present invention relates to a power supply apparatus, and especially relates to a power supply apparatus with low standby power consumption.

2. Description of the Related Art

An alternating current power is transferred into a direct current power by a power supply apparatus. An electronic apparatus is driven by the direct current power.

The power supply apparatus is configured to enter a standby mode if the electronic apparatus is not in use or the electronic apparatus is removed from the power supply apparatus. The efficiency of the power supply apparatus is better if the standby power consumption of the power supply apparatus is lower.

However, the disadvantage of the related art power supply apparatus is that the standby power consumption of the related art power supply apparatus is not low enough. The related art power supply apparatus still wastes too much energy in the standby mode. Therefore, it is very important to invent a power supply apparatus with low standby power consumption.

SUMMARY OF THE INVENTION

In order to solve the above-mentioned problems, an object of the present invention is to provide a power supply apparatus with low standby power consumption.

In order to achieve the object of the present invention mentioned above, the power supply apparatus is applied to an electronic apparatus and an alternating current power apparatus. The power supply apparatus includes an output switch unit electrically connected to the electronic apparatus, a load detecting unit electrically connected to the electronic apparatus and the output switch unit, an intermittent driving unit electrically connected to the output switch unit and the load detecting unit, a no-load detecting unit electrically connected to the output switch unit and the intermittent driving unit, a start unit electrically connected to the intermittent driving unit, a power factor correction and pulse width modulation controller electrically connected to the start unit and the no-load detecting unit, a secondary-side transformer coil electrically connected to the no-load detecting unit and the output switch unit, and a main converter electrically connected to the alternating current power apparatus, the power factor correction and pulse width modulation controller, and the secondary-side transformer coil. The no-load detecting unit is configured to detect that the electronic apparatus is removed from the power supply apparatus by sensing the secondary-side transformer coil. The no-load detecting unit is configured to turn off the output switch unit and the power factor correction and pulse width modulation controller when the electronic apparatus is removed from the power supply apparatus. The intermittent driving unit is configured to drive the start unit once a pre-determined time. The start unit is configured to drive the power factor correction and pulse width modulation controller. The load detecting unit is configured to detect that the electronic apparatus is connected to the power supply apparatus. The load detecting unit is configured to drive the intermittent driving unit. The intermittent driving unit is configured to drive the start unit. The start unit is configured to drive the power factor correction and pulse width modulation controller.

DETAILED DESCRIPTION OF THE INVENTION

Figure 1:
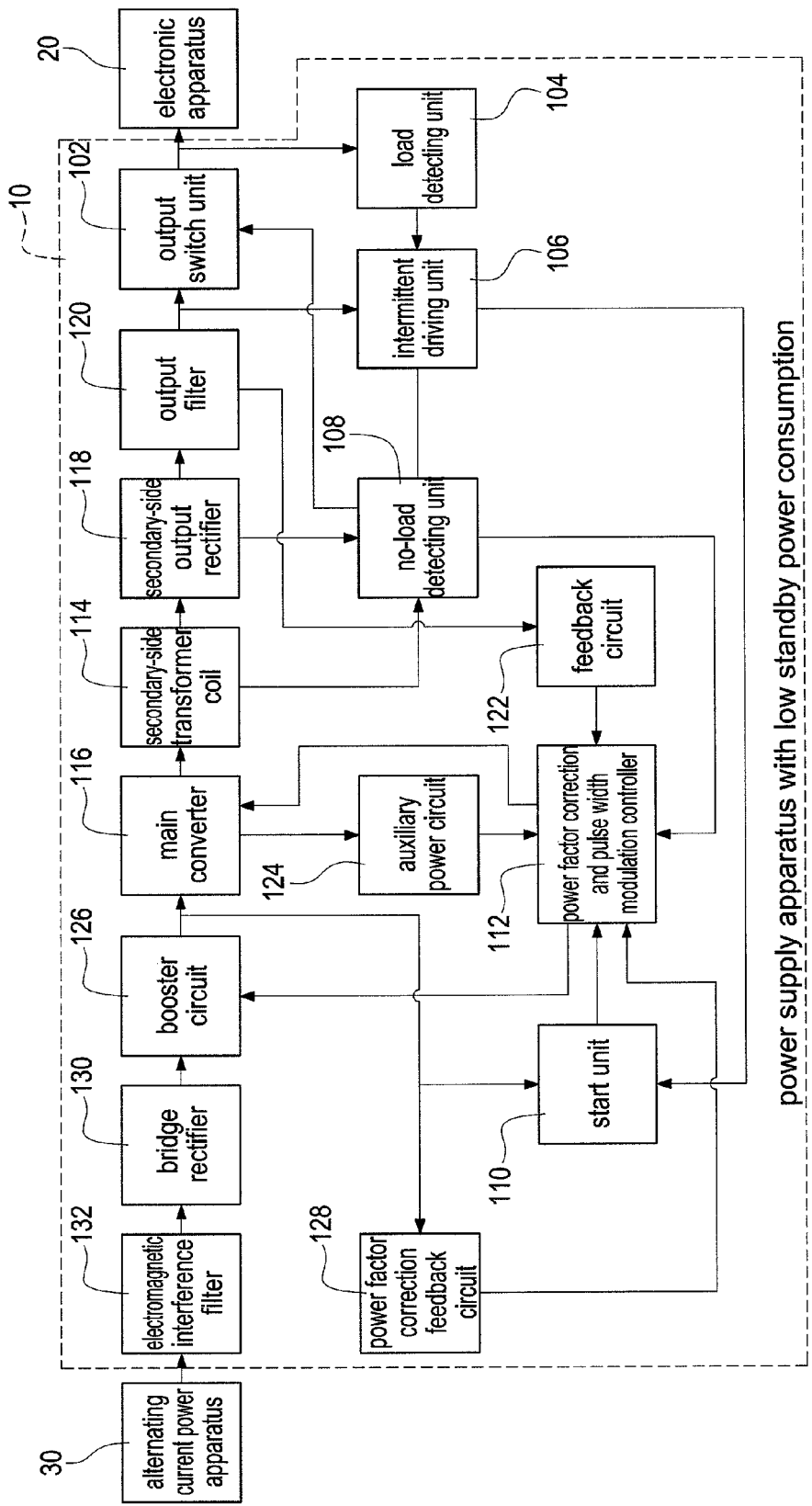
FIG. 1 shows a block diagram of the power supply apparatus with low standby power consumption of the present invention.

FIG. 1 shows a block diagram of the power supply apparatus with low standby power consumption of the present invention. A power supply apparatus 10 is applied to an electronic apparatus 20 and an alternating current power apparatus 30.

The power supply apparatus 10 includes an output switch unit 102, a load detecting unit 104, an intermittent driving unit 106, a no-load detecting unit 108, a start unit 110, a power factor correction and pulse width modulation controller 112, a secondary-side transformer coil 114, a main converter 116, a secondary-side output rectifier 118, an output filter 120, a feedback circuit 122, an auxiliary power circuit 124, a booster circuit 126, a power factor correction feedback circuit 128, a bridge rectifier 130, and an electromagnetic interference filter 132.

The power factor correction and pulse width modulation controller 112 is electrically connected to the no-load detecting unit 108, the start unit 110, the main converter 116, the feedback circuit 122, the auxiliary power circuit 124, the booster circuit 126, and the power factor correction feedback circuit 128. The no-load detecting unit 108 is electrically connected to the output switch unit 102, the intermittent driving unit 106, the secondary-side transformer coil 114, and the secondary-side output rectifier 118.

The electromagnetic interference filter 132 is electrically connected to the alternating current power apparatus 30 and the bridge rectifier 130. The booster circuit 126 is electrically connected to the bridge rectifier 130, the main converter 116, the start unit 110, and the power factor correction feedback circuit 128. The main converter 116 is electrically connected to the auxiliary power circuit 124 and the secondary-side transformer coil 114. The secondary-side output rectifier 118 is electrically connected to the secondary-side transformer coil 114 and the output filter 120.

The feedback circuit 122 is electrically connected to the output filter 120. The output switch unit 102 is electrically connected to the electronic apparatus 20, the load detecting unit 104, the intermittent driving unit 106, and the output filter 120. The load detecting unit 104 is electrically connected to the intermittent driving unit 106. The intermittent driving unit 106 is electrically connected to the start unit 110.

The procedures of the present invention are as following.

Figure 2:
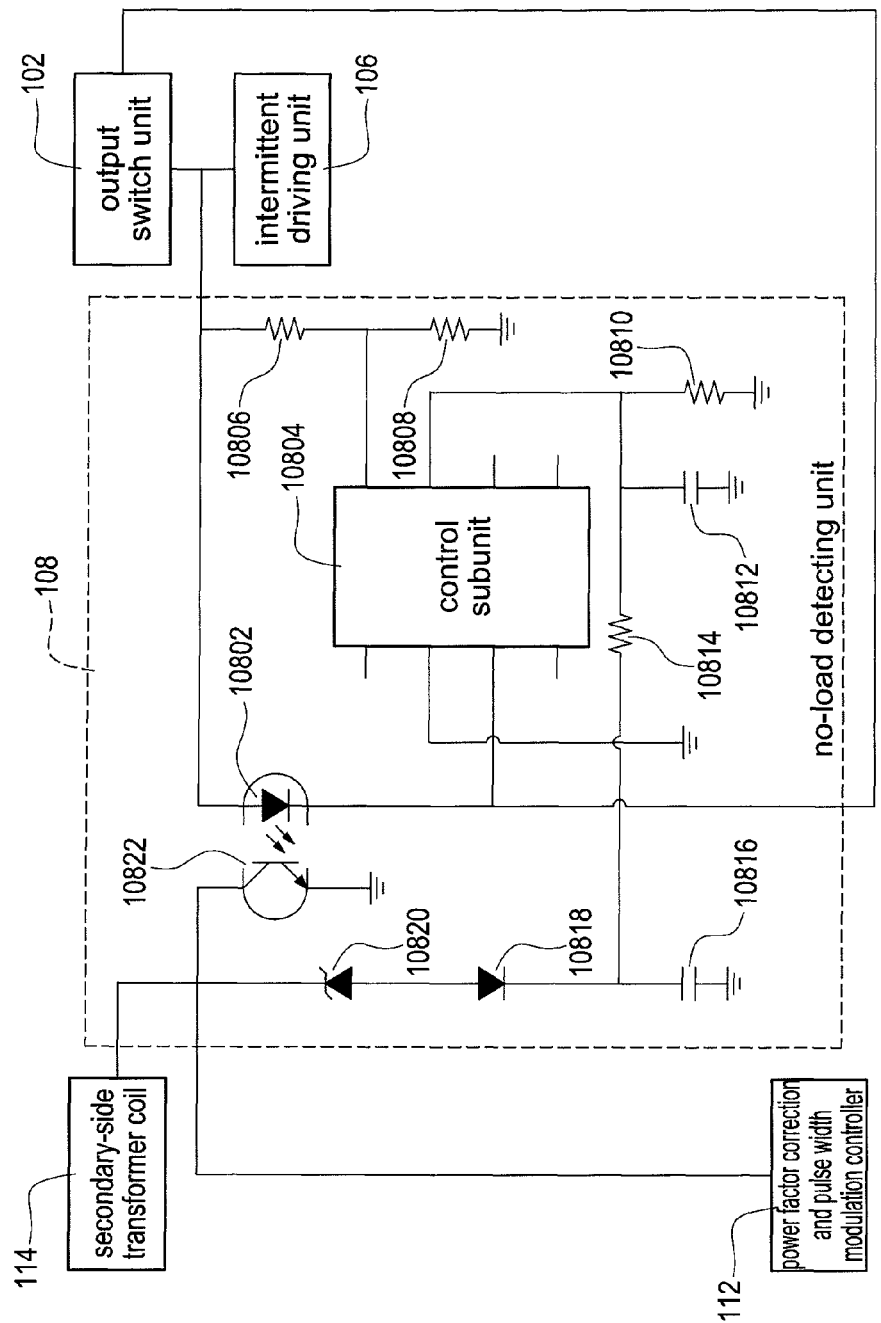
FIG. 2 shows a block diagram of the no-load detecting unit of the present invention.

The electronic apparatus 20 is removed from the power supply apparatus 10 and that can be certified by detecting the pulse width modulation waveform (the frequency and the duty cycle) of the secondary-side transformer coil 114 by the no-load detecting unit 108. Then, the no-load detecting unit 108 is configured to turn off the output switch unit 102. The no-load detecting unit 108 is configured to turn off the power factor correction and pulse width modulation controller 112 through a second optical coupler transmitting part 10802 and a second optical coupler receiving part 10822 (as shown in FIG. 2). In another word, the power supply apparatus 10 is in a sleeping mode for power saving.

The load detecting unit 104 is configured to detect whether the electronic apparatus 20 is re-connected to the power supply apparatus 10 or not when the power supply apparatus 10 is in the sleeping mode. The load detecting unit 1.04 is configured to drive the intermittent driving unit 106 when the electronic apparatus 20 is re-connected to the power supply apparatus 10. Then, the intermittent driving unit 106 is configured to drive the start unit 110. The start unit 110 is configured to drive the power factor correction and pulse width modulation controller 112. In another word, the power supply apparatus 10 is turned on.

In the meantime, the no-load detecting unit 108 detects that the electronic apparatus 20 is connected to the power supply apparatus 10. Therefore, the no-load detecting unit 108 will not turn off the output switch unit 102 and the power factor correction and pulse width modulation controller 112.

Figure 4:
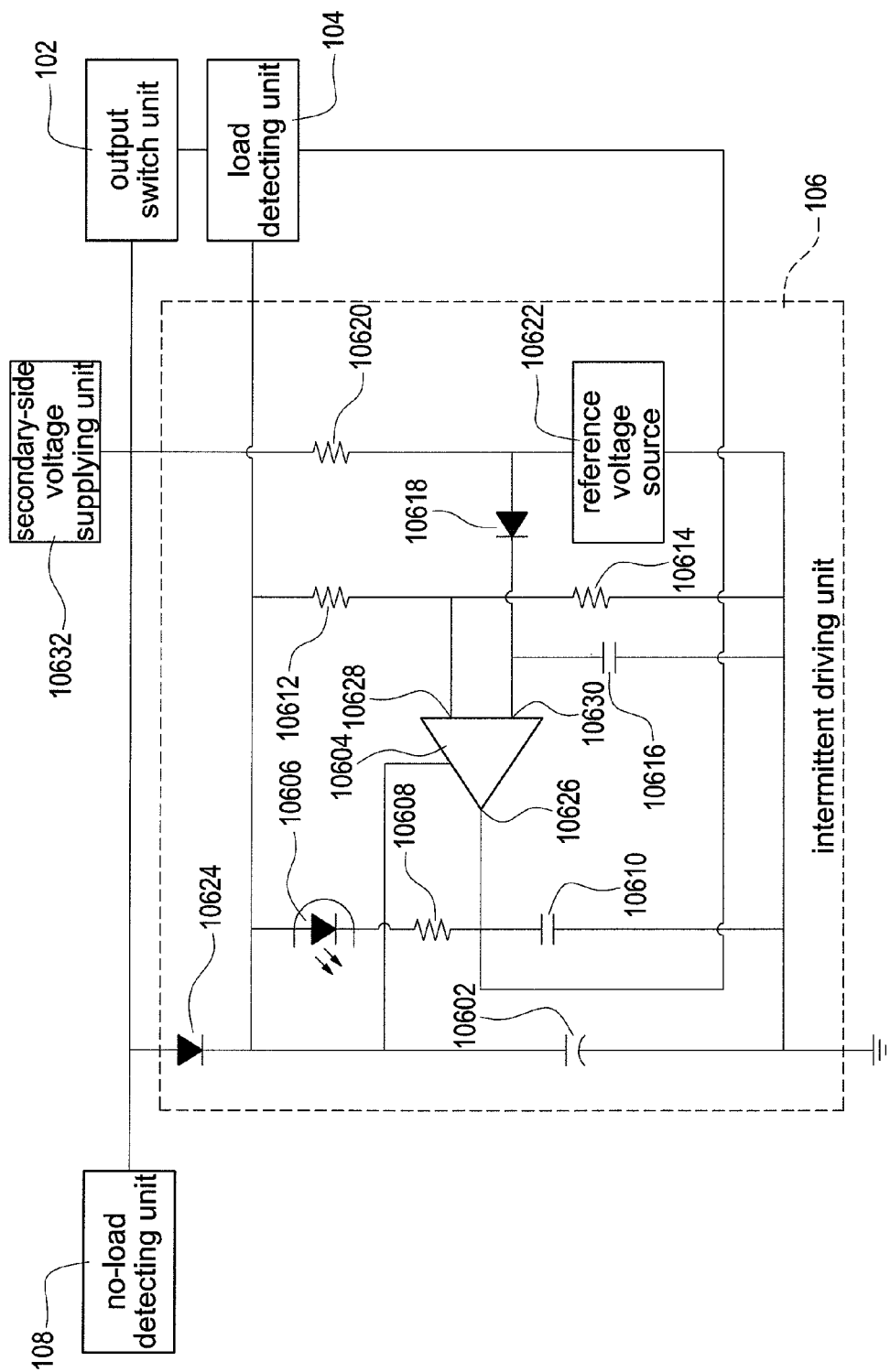
FIG. 4 shows a block diagram of the intermittent driving unit of the present invention.

Moreover, a discharging capacitor 10602 (as shown in FIG. 4) discharges for supplying power to the load detecting unit 104 and the intermittent driving unit 106 and other related parts when the power supply apparatus 10 is in the sleeping mode. Therefore, the power consumption of the load detecting unit 104 and the intermittent driving unit 106 and other related parts should be small.

However, the electricity storage of the discharging capacitor 10602 will be used up. Therefore, the intermittent driving unit 106 is configured to drive the start unit 110 once a pre-determined time (for example, 300 seconds) when the power supply apparatus 10 is in the sleeping mode. Then, the start unit 110 is configured to drive the power factor correction and pulse width modulation controller 112 (the power supply apparatus 10 is woken up) for charging the discharging capacitor 10602.

Moreover, as mentioned above, the no-load detecting unit 108 is configured to turn off the output switch unit 102 and the power factor correction and pulse width modulation controller 112 if the electronic apparatus 20 is still not re-connected to the power supply apparatus 10. Then, the power supply apparatus 10 is woken up once the pre-determined time.

Moreover, the power factor correction and pulse width modulation controller 112 is the core of the power supply apparatus 10. The power factor correction and pulse width modulation controller 112 is configured to control the main converter 116 and other related parts for transferring an alternating current power into a direct current power.

FIG. 2 shows a block diagram of the no-load detecting unit of the present invention. The no-load detecting unit 108 includes the second optical coupler transmitting part 10802, a control subunit 10804, a tenth resistor 10806, an eleventh resistor 10808, a twelfth resistor 10810, a third capacitor 10812, a thirteenth resistor 10814, a fourth capacitor 10816, a third diode 10818, a first Zener diode 10820, and the second optical coupler receiving part 10822.

Figure 3:
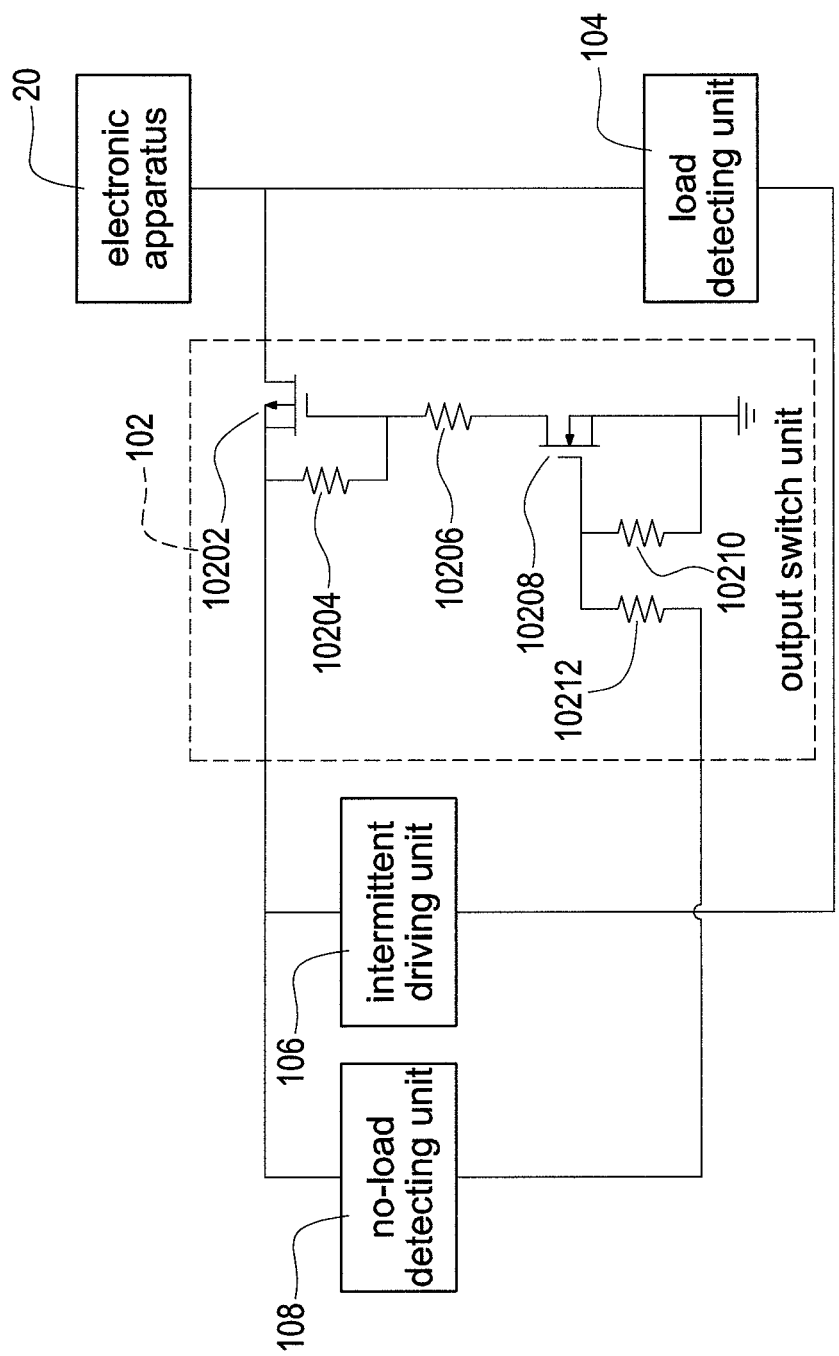
FIG. 3 shows a block diagram of the output switch unit of the present invention.

The control subunit 10804 is electrically connected to the second optical coupler transmitting part 10802, a seventeenth resistor 10212 of the output switch unit 102 (as shown in FIG. 3), the tenth resistor 10806, the eleventh resistor 10808, the twelfth resistor 10810, the third capacitor 10812, and the thirteenth resistor 10814. The second optical coupler transmitting part 10802 is electrically connected to the tenth resistor 10806, the output switch unit 102, the intermittent driving unit 106, and the second optical coupler receiving part 10822.

The third diode 10818 is electrically connected to the thirteenth resistor 10814, the fourth capacitor 10816, and the first Zener diode 10820. The first Zener diode 10820 is electrically connected to the secondary-side transformer coil 114. The second optical coupler receiving part 10822 is electrically connected to the power factor correction and pulse width modulation controller 112.

FIG. 3 shows a block diagram of the output switch unit of the present invention. The output switch unit 102 includes a second transistor 10202, a fourteenth resistor 10204, a fifteenth resistor 10206, a third transistor 10208, a sixteenth resistor 10210, and a seventeenth resistor 10212.

The second transistor 10202 is electrically connected to the electronic apparatus 20, the load detecting unit 104, the intermittent driving unit 106, the no-load detecting unit 108, the fourteenth resistor 10204, and the fifteenth resistor 10206. The third transistor 10208 is electrically connected to the fifteenth resistor 10206, the sixteenth resistor 10210, and the seventeenth resistor 10212.

The output switch unit 102 is configured to separate an output side of the power supply apparatus 10 from the electronic apparatus 20 when the output switch unit 102 is turned off. Therefore, the load detecting unit 104 is configured to purely detect whether the electronic apparatus 20 is re-connected to the power supply apparatus 10 or not.

FIG. 4 shows a block diagram of the intermittent driving unit of the present invention. The intermittent driving unit 106 includes the discharging capacitor 10602, a first operational amplifier 10604, a first optical coupler transmitting part 10606, a first resistor 10608, a first capacitor 10610, a second resistor 10612, a third resistor 10614, a second capacitor 10616, a first diode 10618, a fourth resistor 10620, a reference voltage source 10622, and a second diode 10624. The first operational amplifier 10604 includes a first operational amplifier output side 10626, a first operational amplifier first input side 10628, and a first operational amplifier second input side 10630.

The first operational amplifier output side 10626 is electrically connected to the first resistor 10608, the load detecting unit 104, and the first capacitor 10610. The first operational amplifier first input side 10628 is electrically connected to the second resistor 10612 and the third resistor 10614. The first operational amplifier second input side 10630 is electrically connected to the second capacitor 10616 and the first diode 10618.

The discharging capacitor 10602 is electrically connected to the second diode 10624, the first operational amplifier 10604, the first optical coupler transmitting part 10606, the second resistor 10612, and the load detecting unit 104. The reference voltage source 10622 is electrically connected to the first diode 10618 and the fourth resistor 10620. The first resistor 10608 is electrically connected to the first optical coupler transmitting part 10606.

The power supply apparatus 10 further includes a secondary-side voltage supplying unit 10632. The secondary-side voltage supplying unit 10632 is configured to supply power to the components of the power supply apparatus 10 when the power supply apparatus 10 is in a working status. The second diode 10624 is electrically connected to the fourth resistor 10620, the output switch unit 102, the no-load detecting unit 108, and the secondary-side voltage supplying unit 10632.

The voltage drop slope of the circuit loop which includes the second resistor 10612 and the third resistor 10614 is larger than the voltage drop slope of the circuit loop (constant voltage reference point) which includes the second capacitor 10616, the first diode 10618, the reference voltage source 10622, and the fourth resistor 10620. Therefore, the output logic of the first operational amplifier 10604 is changed when the voltage of the first operational amplifier first input side 10628 is lower than the voltage of the first operational amplifier second input side 10630.

Figure 5:
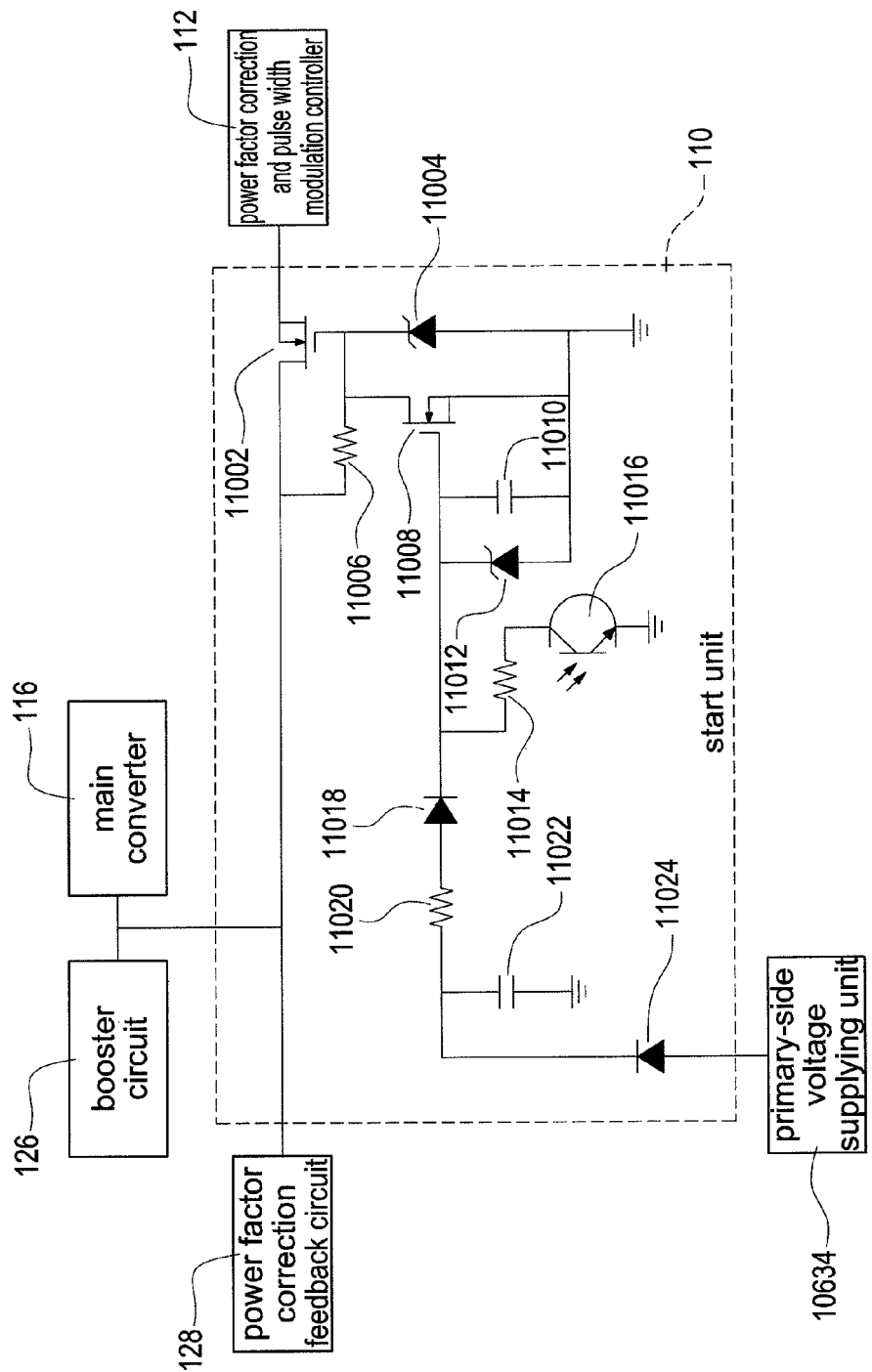
FIG. 5 shows a block diagram of the start unit of the present invention.

The first optical coupler transmitting part 10606 does not transmit optical signals to a first optical coupler receiving part 11016 (as shown in FIG. 5) when the logic status of the first operational amplifier output side 10626 is 1. Therefore, the power factor correction and pulse width modulation controller 112 is turned off.

The first optical coupler transmitting part 10606 transmits optical signals to the first optical coupler receiving part 11016 when the logic status of the first operational amplifier output side 10626 is 0. Therefore, the power factor correction and pulse width modulation controller 112 is turned on.

In another word, a small current passes through the first optical coupler transmitting part 10606 when the power supply apparatus 10 is in the working status. The logic status of the first operational amplifier output side 10626 is 0. No current passes through the first optical coupler transmitting part 10606 when the power supply apparatus 10 is in the sleeping mode. The logic status of the first operational amplifier output side 10626 is 1. With such anti-logic design (0 for working status; 1 for sleeping mode), the weak electricity storage of the discharging capacitor 10602 can sustain the pre-determined time for 300 seconds.

FIG. 5 shows a block diagram of the start unit of the present invention. The start unit 110 includes a fourth transistor 11002, a second Zener diode 11004, an eighteenth resistor 11006, a fifth transistor 11008, a fifth capacitor 11010, a third Zener diode 11012, a nineteenth resistor 11014, a first optical coupler receiving part 11016, a fourth diode 11018, a twentieth resistor 11020, a sixth capacitor 11022, and a fifth diode 11024.

The fifth transistor 11008 is electrically connected to the fourth transistor 11002, the second Zener diode 11004, the eighteenth resistor 11006, the fifth capacitor 11010, the third Zener diode 11012, the nineteenth resistor 11014, and the fourth diode 11018. The nineteenth resistor 11014 is electrically connected to the first optical coupler receiving part 11016.

The power supply apparatus 10 further includes a primary-side voltage supplying unit 10634. The primary-side voltage supplying unit 10634 is configured to supply power to the components of the power supply apparatus 10 when the power supply apparatus 10 is in the working status. The fifth diode 11024 is electrically connected to the primary-side voltage supplying unit 10634, the twentieth resistor 11020, and the sixth capacitor 11022. The twentieth resistor 11020 is electrically connected to the fourth diode 11018. The fourth transistor 11002 is electrically connected to the power factor correction and pulse width modulation controller 112, the main converter 116, the booster circuit 126, the power factor correction feedback circuit 128, and the eighteenth resistor 11006.

Figure 6:
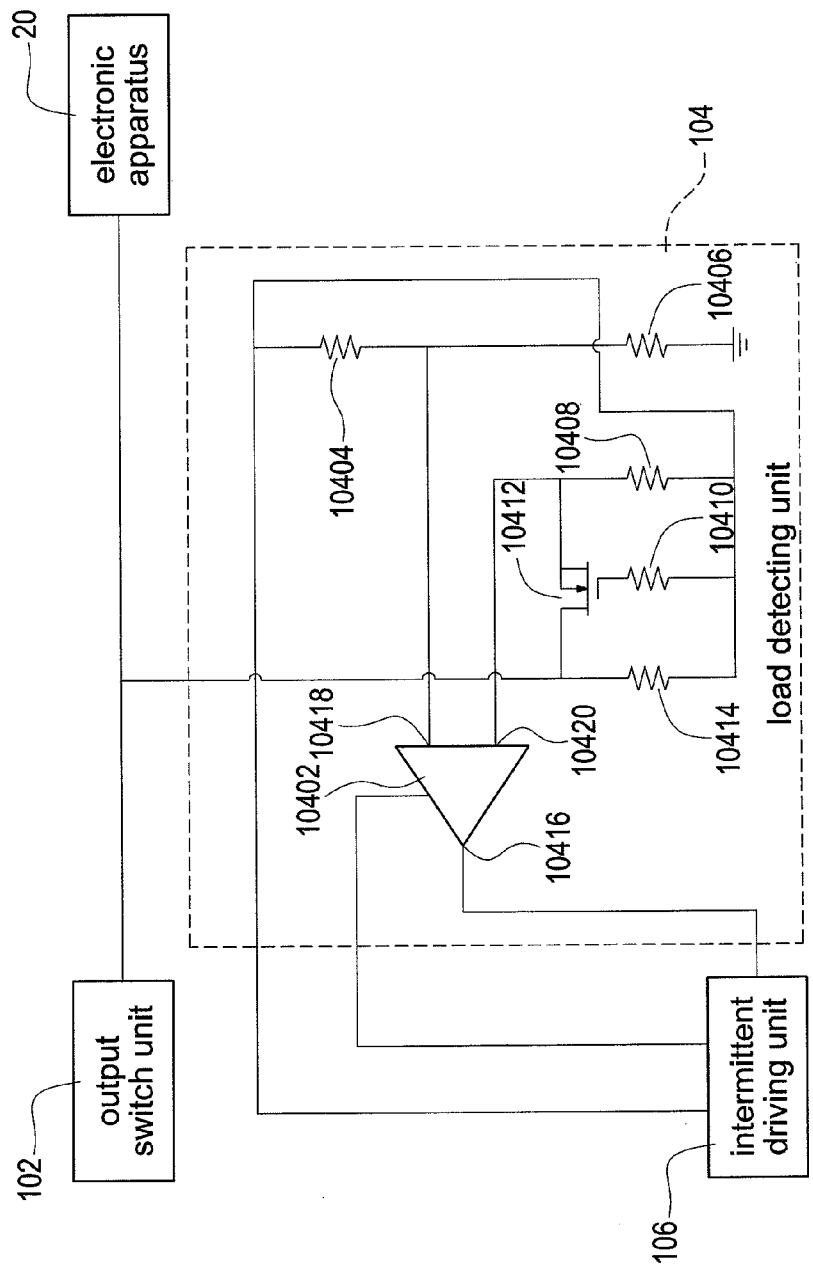
FIG. 6 shows a block diagram of the load detecting unit of the present invention.

FIG. 6 shows a block diagram of the load detecting unit of the present invention. The load detecting unit 104 includes a second operational amplifier 10402, a fifth resistor 10404, a sixth resistor 10406, a seventh resistor 10408, an eighth resistor 10410, a first transistor 10412, and a ninth resistor 10414. The second operational amplifier 10402 includes a second operational amplifier output side 10416, a second operational amplifier first input side 10418, and a second operational amplifier second input side 10420.

The second operational amplifier 10402 is electrically connected to the discharging capacitor 10602. The second operational amplifier output side 10416 is electrically connected to the first operational amplifier output side 10626. The seventh resistor 10408 is electrically connected to the eighth resistor 10410, the first transistor 10412, the ninth resistor 10414, the second operational amplifier second input side 10420, the fifth resistor 10404, and the intermittent driving unit 106.

The second operational amplifier first input side 10418 is electrically connected to the fifth resistor 10404 and the sixth resistor 10406. The first transistor 10412 is electrically connected to the eighth resistor 10410, the ninth resistor 10414, the electronic apparatus 20, and the output switch unit 102.

When the electronic apparatus 20 is connected to the power supply apparatus 10, the logic status of the second operational amplifier output side 10416 is 0 because of the voltage difference between the second operational amplifier first input side 10418 and the second operational amplifier second input side 10420. Therefore, the first optical coupler transmitting part 10606 is conducted. The power supply apparatus 10 is turned on.

Moreover, considering the tolerances of the components, the electronic apparatus 20 is judged to be really connected to the power supply apparatus 10 if the current detected by the no-load detecting unit 108 and the load detecting unit 104 is over 30 mA.

The features of the present invention are as following. The no-load detecting unit 108 is configured to detect that the electronic apparatus 20 is removed from the power supply apparatus 10 by sensing the secondary-side transformer coil 114. Then, the no-load detecting unit 108 is configured to turn off the output switch unit 102 and the power factor correction and pulse width modulation controller 112. The intermittent driving unit 106 is configured to drive the start unit 110 once the pre-determined time. The start unit 110 is configured to drive the power factor correction and pulse width modulation controller 112.

Moreover, the load detecting unit 104 is configured to detect that the electronic apparatus 20 is connected to the power supply apparatus 10. Then, the load detecting unit 104 is configured to drive the intermittent driving unit 106. The intermittent driving unit 106 is configured to drive the start unit 110. The start unit 110 is configured to drive the power factor correction and pulse width modulation controller 112.

Although the present invention has been described with reference to the preferred embodiment thereof, it will be understood that the invention is not limited to the details thereof. Various substitutions and modifications have been suggested in the foregoing description, and others will occur to those of ordinary skill in the art. Therefore, all such substitutions and modifications are intended to be embraced within the scope of the invention as defined in the appended claims.

What is claimed is:

1. A power supply apparatus applied to an electronic apparatus and an alternating current power apparatus, the power supply apparatus including:
   an output switch unit electrically connected to the electronic apparatus;
   a load detecting unit electrically connected to the electronic apparatus and the output switch unit;
   an intermittent driving unit electrically connected to the output switch unit and the load detecting unit;
   a no-load detecting unit electrically connected to the output switch unit and the intermittent driving unit;
   a start unit electrically connected to the intermittent driving unit;

a power factor correction and pulse width modulation controller electrically connected to the start unit and the no-load detecting unit;
a secondary-side transformer coil electrically connected to the no-load detecting unit and the output switch unit; and
a main converter electrically connected to the alternating current power apparatus, the power factor correction and pulse width modulation controller, and the secondary-side transformer coil,
wherein the no-load detecting unit is configured to detect that the electronic apparatus is removed from the power supply apparatus by sensing the secondary-side transformer coil;
wherein the no-load detecting unit is configured to turn off the output switch unit and the power factor correction and pulse width modulation controller when the electronic apparatus is removed from the power supply apparatus; the intermittent driving unit is configured to drive the start unit once a pre-determined time; the start unit is configured to drive the power factor correction and pulse width modulation controller;
wherein the load detecting unit is configured to detect that the electronic apparatus is connected to the power supply apparatus; the load detecting unit is configured to drive the intermittent driving unit; the intermittent driving unit is configured to drive the start unit; the start unit is configured to drive the power factor correction and pulse width modulation controller;
wherein the intermittent driving unit includes a discharging capacitor electrically connected to the load detecting unit;
wherein the discharging capacitor discharges to supply power to the load detecting unit and the intermittent driving unit when the power supply apparatus is in a sleeping mode;
wherein the intermittent driving unit is configured to drive the start unit when the power supply apparatus is in the sleeping mode for a pre-determined time, and then the start unit is configured to drive the power factor correction and pulse width modulation controller for charging the discharging capacitor.

2. The power supply apparatus in claim 1, wherein the intermittent driving unit further includes:
a first operational amplifier electrically connected to the discharging capacitor, the first operational amplifier including a first operational amplifier output side, a first operational amplifier first input side, and a first operational amplifier second input side; and
a first optical coupler transmitting part electrically connected to the discharging capacitor and the first operational amplifier output side.

3. A power apparatus applied to an electronic apparatus and an alternating current power apparatus, the power supply apparatus including:
an output switch unit electrically connected to the electronic apparatus;
a load detecting unit electrically connected to the electronic apparatus and the output switch unit;
an intermittent driving unit electrically connected to the output switch unit and the load detecting unit;
a no-load detecting unit electrically connected to the output switch unit and the intermittent driving unit;
a start unit electrically connected to the intermittent driving unit;
a power factor correction and pulse width modulation controller electrically connected to the start unit and the no-load detecting unit;
a secondary-side transformer coil electrically connected to the no-load detecting unit and the output switch unit; and
a main converter electrically connected to the alternating current power apparatus, the power factor correction an pulse width modulation controller, and the secondary-side transformer coil,
wherein the no-load detecting unit is configured to detect that the electronic apparatus is removed from the power supply apparatus by sensing the secondary-side transformer coil;
wherein the no-load detecting unit is configured to turn off the output switch unit and the power factor correction and pulse width modulation controller when the electronic apparatus is removed from the power supply apparatus; the intermittent driving unit is configured to drive the start unit once a pre-determined time; the start unit is configured to drive the power factor correction and pulse width modulation controller;
wherein the load detecting unit is configured to detect that the electronic apparatus is connected to the power supply apparatus; the load detecting unit is configured to drive the intermittent driving unit; the intermittent driving unit is configured to drive the start unit; the start unit is configured to drive the power factor correction and pulse width modulation controller;
wherein the intermittent driving unit includes:
a discharging capacitor electrically connected to the load detecting unit;
a first operational amplifier electrically connected to the discharging capacitor, the first operational amplifier including a first operational amplifier output side, a first operational amplifier first input side, and a first operational amplifier second input side; and
a first optical coupler transmitting part electrically connected to the discharging capacitor and the first operational amplifier output side;
a first resistor electrically connected to the first operational amplifier output side and the first optical coupler transmitting part;
a first capacitor electrically connected to the first operational amplifier output side and the first resistor;
a second resistor electrically connected to the first operational amplifier first input side and the discharging capacitor;
a third resistor electrically connected to the first operational amplifier first input side and the second resistor;
a second capacitor electrically connected to the first operational amplifier second input side;
a first diode electrically connected to the first operational amplifier second input side;
a fourth resistor electrically connected to the no-load detecting unit, the output switch unit, and the first diode;
a reference voltage source electrically connected to the first diode and the fourth resistor; and
a second diode electrically connected to the no-load detecting unit, the output switch unit, and the discharging capacitor.

4. The power supply apparatus in claim 3, wherein the load detecting unit includes:
a second operational amplifier electrically connected to the discharging capacitor, the second operational amplifier including a second operational amplifier output side, a second operational amplifier first input side, and a second operational amplifier second input side, the second operational amplifier output side electrically connected to the first operational amplifier output side;

a fifth resistor electrically connected to the second operational amplifier first input side and the discharging capacitor;

a sixth resistor electrically connected to the second operational amplifier first input side and the fifth resistor;

a seventh resistor electrically connected to the second operational amplifier second input side and the fifth resistor;

an eighth resistor electrically connected to the seventh resistor;

a first transistor electrically connected to the second operational amplifier second input side, the seventh resistor, the eighth resistor, the output switch unit, and the electronic apparatus; and a ninth resistor electrically connected to the first transistor, the output switch unit, and the electronic apparatus.

5. The power supply apparatus in claim 4, wherein the no-load detecting unit includes:

a second optical coupler transmitting part electrically connected to the output switch unit and the intermittent driving unit;

a control subunit electrically connected to the second optical coupler transmitting part and the output switch unit;

a tenth resistor electrically connected to the output switch unit, the intermittent driving unit, the second optical coupler transmitting part, and the control subunit;

an eleventh resistor electrically connected to the control subunit and the tenth resistor;

a twelfth resistor electrically connected to the control subunit;

a third capacitor electrically connected to the control subunit and the twelfth resistor;

a thirteenth resistor electrically connected to the control subunit, the twelfth resistor, and the third capacitor;

a fourth capacitor electrically connected to the thirteenth resistor;

a third diode electrically connected to the thirteenth resistor and the fourth capacitor;

a first Zener diode electrically connected to the third diode and the secondary-side transformer coil; and a second optical coupler receiving part electrically connected to the second optical coupler transmitting part and the power factor correction and pulse width modulation controller.

6. The power supply apparatus in claim 5, wherein the output switch unit includes:

a second transistor electrically connected to the intermittent driving unit, the no-load detecting unit, and the electronic apparatus;

a fourteenth resistor electrically connected to the intermittent driving unit, the no-load detecting unit, and the second transistor;

a fifteenth resistor electrically connected to the fourteenth resistor and the second transistor;

a third transistor electrically connected to the fifteenth resistor;

a sixteenth resistor electrically connected to the third transistor; and a seventeenth resistor electrically connected to the third transistor, the sixteenth resistor, and the no-load detecting unit.

7. The power supply apparatus in claim 6, wherein the start unit includes:

a fourth transistor electrically connected to the power factor correction and pulse width modulation controller and the main converter;

a second Zener diode electrically connected to the fourth transistor;

an eighteenth resistor electrically connected to the main converter, the fourth transistor, and the second Zener diode;

a fifth transistor electrically connected to the fourth transistor, the second Zener diode, and the eighteenth resistor;

a fifth capacitor electrically connected to the fifth transistor; and a third Zener diode electrically connected to the fifth transistor.

8. The power supply apparatus in claim 7, wherein the start unit further includes:

a nineteenth resistor electrically connected to the fifth transistor;

a first optical coupler receiving part electrically connected to the first optical coupler transmitting part and the nineteenth resistor;

a fourth diode electrically connected to the fifth transistor;

a twentieth resistor electrically connected to the fourth diode;

a sixth capacitor electrically connected to the twentieth resistor; and a fifth diode electrically connected to the twentieth resistor and the sixth capacitor.

9. The power supply apparatus in claim 8, further including:

a secondary-side output rectifier electrically connected to the secondary-side transformer coil and the no-load detecting unit;

an output filter electrically connected to the secondary-side output rectifier, the intermittent driving unit, and the output switch unit; and a feedback circuit electrically connected to the output filter and the power factor correction and pulse width modulation controller.

10. The power supply apparatus in claim 9, further including:

an auxiliary power circuit electrically connected to the main converter and the power factor correction and pulse width modulation controller;

a booster circuit electrically connected to the main converter, the power factor correction and pulse width modulation controller, and the start unit;

a power factor correction feedback circuit electrically connected to the main converter, the power factor correction and pulse width modulation controller, the start unit, and the booster circuit;

a bridge rectifier electrically connected to the booster circuit; and an electromagnetic interference filter electrically connected to the bridge rectifier and the alternating current power apparatus.

* * * * *